May 11, 1937.  F. COOPER  2,079,987
SELF OILING PITMAN
Filed Oct. 7, 1935
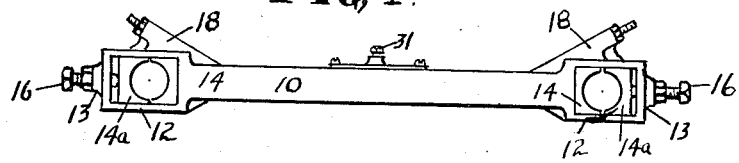
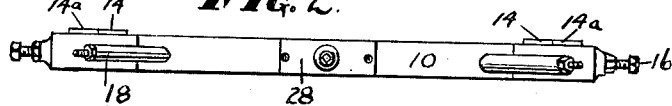
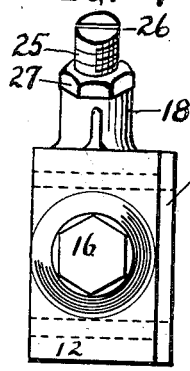
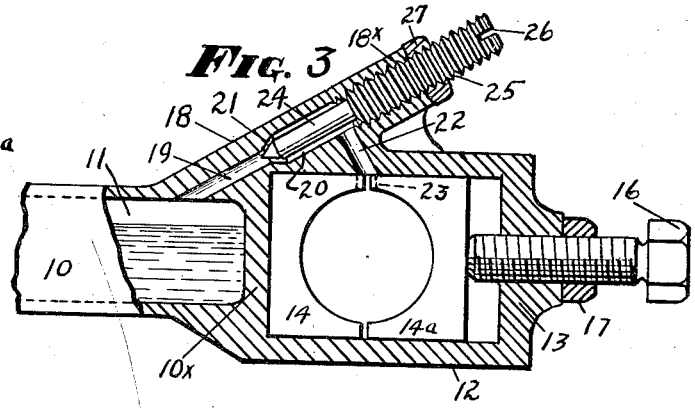
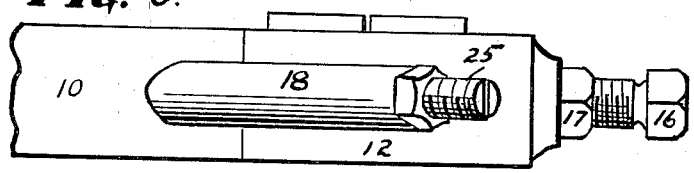
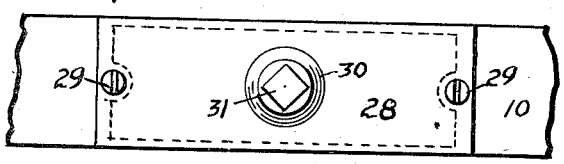
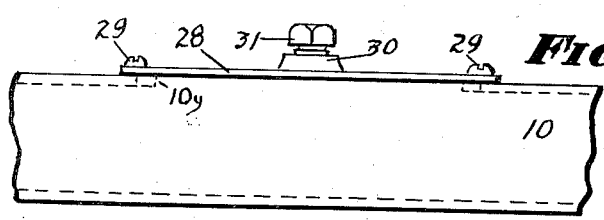
INVENTOR.
Fred Cooper
BY
William C. Edwards Jr.
ATTORNEY.

Patented May 11, 1937

2,079,987

UNITED STATES PATENT OFFICE 2,079,987

SELF OILING PITMAN

Fred Cooper, Garfield, Kans.

Application October 7, 1935, Serial No. 43,840

3 Claims. (Cl. 74—587)

My invention relates to an improvement in a self oiling pitman applicable for use on locomotive drive rods and connecting rods as well as for use in stationary engines and machinery of all kinds, such as sickle drives, straw walkers, threshing machine parts, shaker arms and the like, in which connecting rods and driving rods are employed.

In my invention, the pitman provided with quick take-up bearings is also provided with means for constantly lubricating the bearings while in operation. A further object is to provide an oil reservoir in the device and eliminate the necessity of too frequent lubrication. Also means for adjustment of the oil flow from the reservoir to the bearings is provided. In my device, moving parts are entirely eliminated; and by the manner of oil movement, I gain a continuous oiling system that will give a positive oil feed to the bearings subject to an adjustable control such that oils ranging from light oils to steam cylinder oils or grease may be used without syphoning oil from the bearings. Further objects of the invention will be understood from the following description of the device.

In the drawing: Fig. 1 represents a side view of my improved pitman device. Fig. 2 shows a top plan view of Fig. 1. Fig. 3 shows one end of the pitman seen in Fig. 1 with parts in section for convenience of illustration. Fig. 4 represents an end view of the pitman seen in Fig. 1. Fig. 5 shows a top view of the portion seen in Fig. 3. Fig. 6 shows an enlarged plan view of the clean out plate and oil filling opening of the device as disclosed in Fig. 2. Fig. 7 represents a side view of Fig. 6. Similar numerals of reference indicate corresponding parts throughout all the figures of the drawing.

Referring to the drawing; my improved pitman includes a hollow central shaft section 10 providing an oil chamber 11 as seen in Figs. 1 and 6 and 3 closed by the cross wall portion 10x near each end of the device. The wall 10x serves as an abutment for a quick take-up bearing assembly later disclosed. The ends of the pitman 10 beyond the walls 10x are enlarged as at 12 as a one piece cage or housing for a split bearing assembly such as seen in Figs. 2, 3, 4, and 5 and provided with external flanges 14 and 14a contacting the upper and lower horizontal walls of said housing 12 for proper positioning of the readily insertable paired portions of the bearing assembly for operative purposes; it being obvious that by releasing the adjusting bolt 16, next described, the split bearing assembly may be readily removed from the housing 12. At 16 I show adjusting bolts threaded through the end wall of the housing 12 as seen at 13—13 Fig. 1. By means of the bolts 16 the proper adjustment of the part 14a towards the part 14 of the housed bearing assembly can be made and by means of the nut 17 maintain such adjustment. Integral with the opposite end housings 12 and 12 are shown oppositely and obliquely inclined portions 18 and 18. Within each portion 18 is an oil passage 19, obliquely leading from and connecting with the oil chamber 11 in the pitman. Each passage 19 merges into an enlarged passage 20 at a needle seat 21 as in Fig. 3. A transverse oil discharge passage 22 leads from the passage 20 into the passage 23 formed in the bearing elements 14 and 14a.

Arranged within the tube 20 will be seen the needle 24, threaded as at 25 for adjustable arrangement within the threaded section 18x of the portion 18. By means of a screw driver the end 26 of the needle 24 may be turned so that a proper adjustment of the needle with respect to the seat 21 may be had. A lock nut 27 maintains the adjusted arrangement as will be readily understood.

Referring to Figs. 1, 2, 6, and 7, a cutaway portion of the tubular element 10 as seen at 10y is capped by the cover plate 28 and held in position by cap screws 29 as disclosed. It is obvious that a gasket may be employed in this assemblage to insure an oil tight fitting. On the plate 28 is also provided a boss 30 and an oil plug 31 screwed therein for oil service purposes.

The tube 11 is first filled with oil through the plug 31. In operation connecting rods and the like under reciprocating motion and the like will cause the oil in the chamber 11 to flow backwardly and forwardly in the direction of the stroke and impinge alternately against the opposing wall elements 10x and 10x at the ends of the oil chamber 11, thus the oil will be forced, alternately, up the oppositely inclined channels 19—19 and past the adjusted needle 24 and seat 21 and down into the discharge tubes 22 and 23 so that the drive pin carried by the split bearing assembly 14—14a will be constantly lubricated under pressure to the desired amount as determined by the adjustment at 21. The arrangement of the paired sets of channels 19—20—22—23 with respect to the central chamber 11 is such that syphoning of oil from the bearings is eliminated.

The plate 28 when removed permits the proper cleaning out of settlings, sludge and the like, brushes, wire, etc., being readily admitted for such purposes. If desired a bottom plate similar to the top plate 28 might be employed and thus eliminate the necessity of dismantling the pitman assembly from the machine for cleaning purposes. Oil seal rings may be used on the bearings as in modern practice.

Such modifications may be employed as lie within the scope of the appended claims. Having fully described my invention what I now claim as new and desire to secure by Letters Patent is:

1. In a non-syphoning self-oiling pitman; a tubular central oil chamber intermediate a pair of bearing housing elements respectively sealing the opposite ends of said chamber; each housing constituting a one piece open cage provided with top and bottom wall elements and an outer end wall element; each end of said pitman having an outwardly and upwardly inclined oil passage opening at its lower end to the central chamber at a distance inwardly from the closing wall of the housing; said oil passage merging into an enlarged oil passage at a needle seat; a transverse oil passage through the upper wall of the housing and communicating to said enlarged oil passage; and a threaded needle closing the enlarged oil passage at its outer end and adjustable therein from or towards said needle seat for regulating the amount and degree of oil discharge from the central chamber through said transverse passage during reciprocating movements of said pitman in operative usage.

2. In a non-syphoning self-oiling pitman; a tubular central section comprising an oil storage chamber arranged intermediate a pair of bearing housings integral with and closing the ends of said tubular chamber; each housing constituting a one piece open cage provided with top and bottom wall elements and an outer wall element; a removable two piece bearing assembly for each of said housings, each part of such assembly having an outer flange for contacting the top and bottom walls of the cage when inserted in said housing, and a bolt threaded through the outer end wall of the housing and adjustable from or towards the outer element of the bearing assembly for a quick take-up of said bearing assembly against the end wall of the chamber adjacent thereto and as an abutment therefor; each end of said pitman having an outwardly and upwardly inclined oil passage opening at its lower end to the central chamber and merging into an enlarged oil passage at a needle seat; a transverse oil passage through the upper wall of the housing and communicating to said enlarged oil passage; and a threaded needle closing the upper end of the enlarged passage and adjustable therein from or towards said needle seat for regulating the amount of oil discharge from the central chamber to said bearing assembly during reciprocating movements of said pitman in operative usage.

3. In a pitman of the class described in claim 1; characterized by the further fact that a cover plate assembly caps a cutaway portion of the tubular central chamber and is removable for cleanout purposes.

FRED COOPER.